Feb. 10, 1970           H. A. WAGNER           3,495,232
          DISPLAY SCREEN AND SWITCHING MATRIX
Filed Oct. 7, 1966                         4 Sheets-Sheet 1

WITNESSES:
Bernard R. Gieguay
Wm. B. Sellers

INVENTOR
Howard A. Wagner
BY R. Lewis Gable
ATTORNEY

Feb. 10, 1970  H. A. WAGNER  3,495,232
DISPLAY SCREEN AND SWITCHING MATRIX
Filed Oct. 7, 1966  4 Sheets-Sheet 2
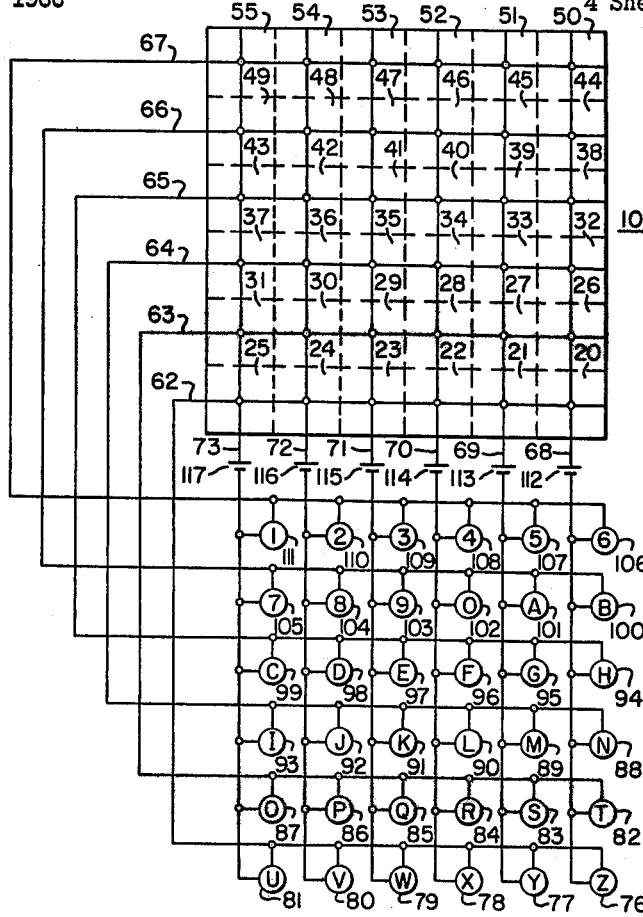
FIG. 3.
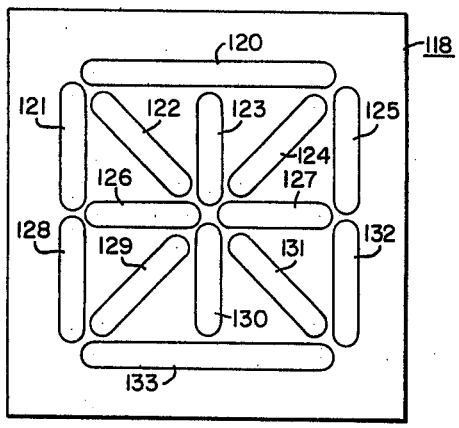
FIG. 4.
FIG. 5.

United States Patent Office 3,495,232
Patented Feb. 10, 1970

3,495,232
DISPLAY SCREEN AND SWITCHING MATRIX
Howard A. Wagner, Pittsburgh, Pa., assignor to Westinghouse Electric Corporation, Pittsburgh, Pa., a corporation of Pennsylvania
Filed Oct. 7, 1966, Ser. No. 585,007
Int. Cl. G08b 23/00
U.S. Cl. 340—324                    8 Claims

ABSTRACT OF THE DISCLOSURE

The present disclosure relates to a switching matrix including a support member for suspending first and second sets of electrical conductors in a spaced transverse relationship, with a flexible layer being disposed over the sets of conductors to allow pressure to be extended therethrough onto the conductors to complete electrical circuit therebetween.

---

The present invention relates generally to switching matrixes, and more particularly to those switching matrixes capable of displaying information in response to the activation of one of the switches of the switching matrix.

In the processes of education, it is very desirable to correlate a physical movement with the presentation and the learning of discrete bits of information. In order to incorporate such a principle into a teaching device, it is necessary to provide a display surface upon which information may be placed in response to an input such as the student touching or pressing upon a discrete area of the display surface. This could be accomplished by associating as by a mechanical link the various portions of the display surface with a switching mechanism that would be actuated upon an input to the display surface. However, the use of individual switching devices would be costly and may interfere with the display of information upon the display surface. Further, the display surface could take the form of an insulating, transparent plate having a plurality of conductive transparent networks built into the display surface so that finger pressure or other appropriate input would change the conductivity of these transparent networks. However, the manufacture of such a display surface and the associated circuits would prove to be quite expensive.

It is therefore, an object of this invention to provide a new and improved switching matrix capable of displaying information in response to activation of discrete portions of the switching matrix.

A further object of this invention is to provide a new and improved switching matrix characterized by its simplicity and which is relatively inexpensive to manufacture.

These and other objects are accomplished in accordance with the teachings of the present invention by providing a new and improved switching matrix including a first set of conductors which are disposed along a first orientation and a second set of conductors disposed along a second orientation transverse with respect to the first set of conductors. The first and second set of conductors are suspended upon a support member including a plurality of depressed portions therein which are separated by a plurality of interstitial ridges. The points of intersection of the first and second conductors correspond with the depressed portions within the support member. Further, the first and second set of conductors are suspended upon the support member at varying depths so they do not normally contact each other. A layer of flexible material is disposed across the first and second set of conductors so that when pressure is applied to a portion of the flexible layer that the corresponding conductors of the first and second sets may be brought together thereby making electrical contact. It is noted that the interstitial ridges between the depressed portions serve to isolate the pressure applied to the flexible layer in one region from affecting the crisscrossing electrical conductors in other regions of the switching matrix.

It is a significant aspect of this invention that either a portion of the support member or the flexible layer itself may be made translucent or "frosted" so that an image may be focused thereon. In such an embodiment, an input pressure applied to one portion of the flexible layer will cause the crisscrossing conductors in this area to be contacted thereby closing a circuit to activate a display which is then displayed through the face of the switching matrix.

These and other objects and advantages of the present invention will become more apparent when considered in view of the following detailed description and drawings, in which:

FIG. 3 is a schematic circuit diagram of the switching matrix of FIG. 1 and an array of lamps connected therewith;

FIG. 4 is a plan view of an assembly of phosphorescent lights arranged on a support member to provide the characters of the alphabet and the digits zero through nine;

FIG. 5 is an illustration of various types of characters which are capable of being presented by the array of lights of FIG. 4;

Figure 1:
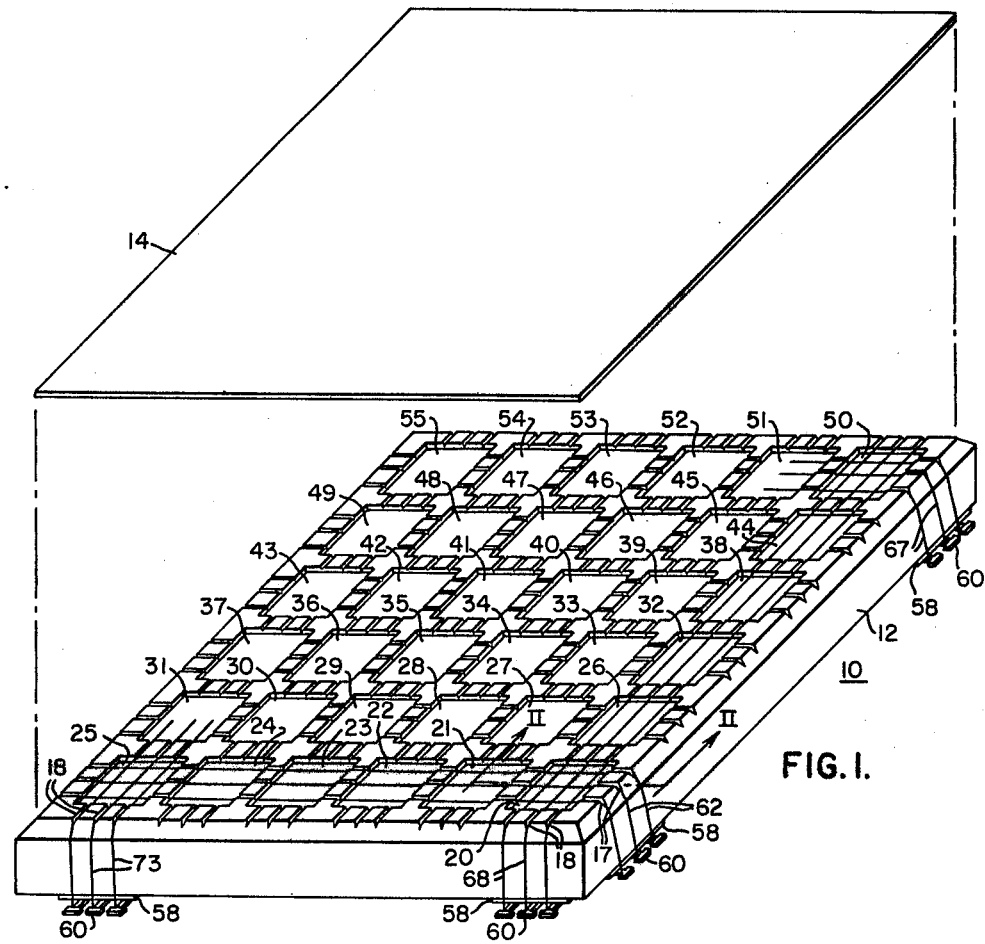
FIGURE 1 shows an orthagonal view of a switching matrix in accordance with teachings of this invention.
Figure 2:
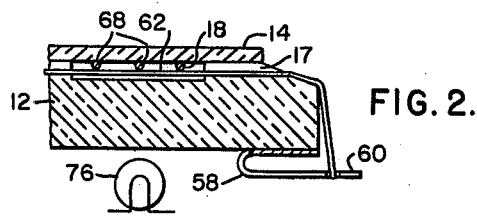
FIG. 2 is a sectional view of the switching matrix of FIG. 1 as taken along lines II—II of FIG. 1.
Figure 6A:
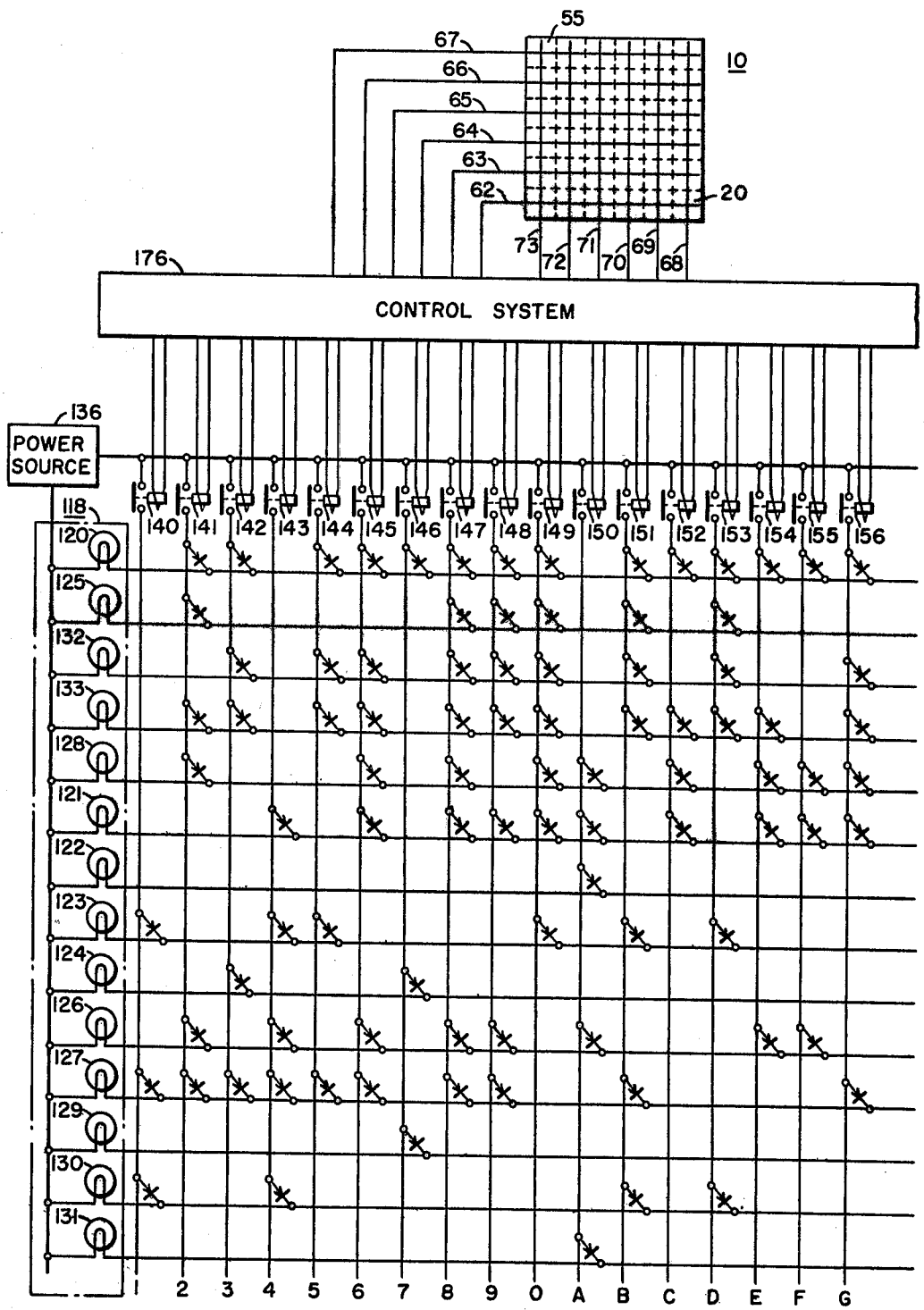
Figure 7:
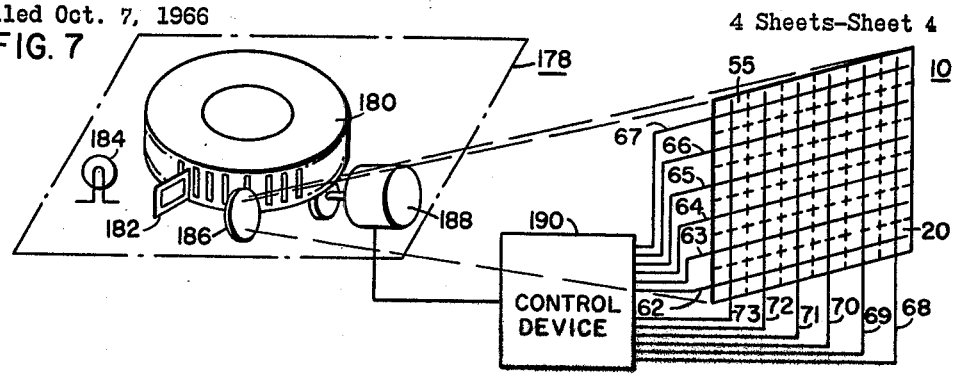
Figure 6B:
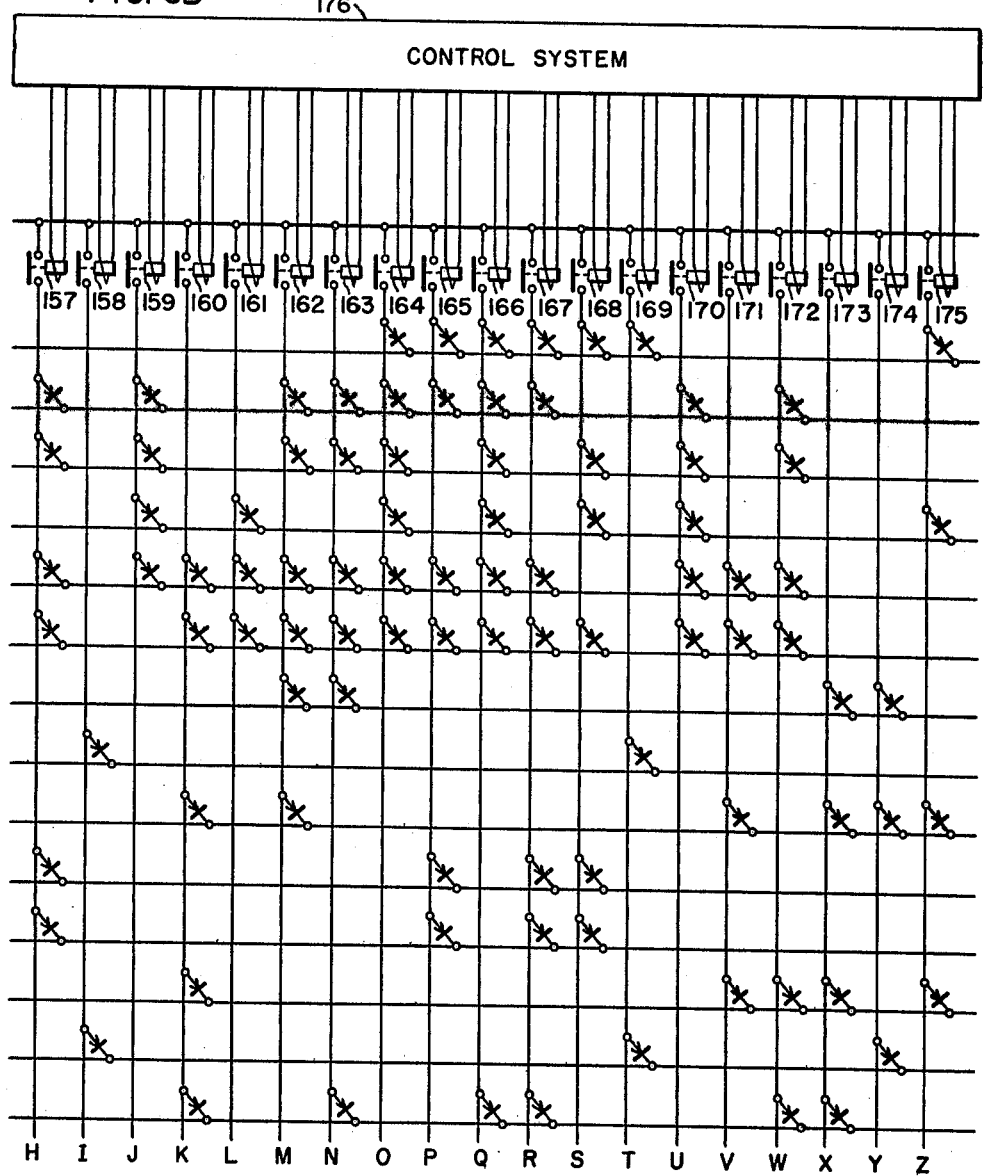

FIGS. 6A and 6B taken together and hereafter collectively referred to as FIG. 6 is a diagrammatic view of a system for selectively energizing the phosphorescent light of the display of FIG. 4 in response to a pressure input to a switching matrix as described with respect to FIGS. 1 and 2; and FIG. 7 is a diagrammatic view of the switching matrix of FIG. 1 in a system designed to project various images onto the switching matrix in response to input pressure on various portions of the matrix.

Referring now to the drawings and in particular to FIG. 1, there is shown a switching matrix 10 including a support member 12 having a plurality of depressions 20 to 55 disposed in rows and columns as shown in FIG. 1. Each of the depressions is separated from each other by isolating, interstitial ridges 16. A first set of conductors designated by the numbers 62 and 67 are disposed in a horizontal orientation (as shown in FIG. 1) whereas a second set of electrical conductors 68 to 73 are disposed in a generally vertical orientation (as shown in FIG. 1) to transverse the conductors of the first set. As shown in FIG. 1, more than one conductor 62 may be disposed in a row or column of the switching matrix 10. In particular, the conductors are suspended under spring bias in a plurality of grooves that interconnect the depressions. As shown in FIG. 2, the conductors 62 are spring biased by a clip 58 having a plurality of spring biasing members 60 to which the ends of the conductors 62 are secured. In a similar manner, the conductors 68 are spring biased by another clip 58 having a plurality of spring biasing members to which the conductors 68 are secured. As particularly shown in FIG. 2, the conductors 62 are disposed at a first depth within the depression 20 corresponding to the depth of the grooves 17 placed in the isolating ridges 16. The second set of conductors 68 are disposed at a second depth less than that of the conductors 62 as determined by the depth of the grooves 18 which are disposed in the horizontal ridges 16. Further, a layer 14 of flexible material is disposed over substantially the entire surface of the switching matrix 12. The flexible layer 14 has the property that it will display upon its face an image directed onto the back of the switching matrix 10. In operation, the user would press a particular portion of the flexible layer 14 thereby depressing one set of conductors against the other set of crisscrossing conductors within the same depression to make electrical contact therebetween. It is noted that the bottom surface of the depressions serves to prevent undue pressure from being applied through the flexible layer 14 to break the electrical conductors.

Referring specifically to FIG. 2, pressure applied to that portion of the flexible layer 14 covering the depression 20 will force one of the conductors 68 downward to thereby contact one of the conductors 62 to make electrical contact therebetween. It is particularly noted that more than one conductor is placed along the rows and columns within a single depression so that precise placement of the pressure by the user is eliminated thus allowing children or those with unskilled or poorly controlled finger movements to easily use the switching matrix. In a similar manner, each of the depressions 20 to 55 are filled with crisscrossing conductors so that when a pressure is applied to the flexible layer 14 that the conductors disposed in the corresponding depression will be brought together to make electrical contact. It is noted that the ridges 16 serve to isolate the pressure applied to one portion of the layer 14 from the wires disposed in the surrounding depressions.

In one particular embodiment of this invention, the support member 12 was made of a Lacite Acrylic Resin plastic material (a trademark of the Du Pont Corp.) and the depressions 20 to 55 could be machined therein. It is noted that in mass production, that the support member 12 could be molded into the configuration shown in FIG. 1. Further, the conductors 62 to 73 could be made of an electrically conductive material such as nickel and have a diameter of .005 inch. In one embodiment a wire of .005 inch diameter was suspended under approximately eight ounces of tension. This level of tension did provide a sensation to touch and did not exceed ⅓ the breaking temperature of a nickel wire of this diameter. Further, the conductors could be silver plated or in the alternative, stainless steel could be used to form the wires. Further, the clips 58 may be secured to the support member 12 as by a plurality of screws inserted therethrough into the member 12. In an illustrative method of assembling, a nickel wire was secured to a biasing member 60 as by soldering and then brought across along the grooves 17 to be wound about a biasing member 60 of a clip 58 disposed on the opposite side of the support member 12. Further, the wire is brought back and forth between the support clips on opposing sides of the support member 12. Then, the continuous wire is cut to separate the columns and the rows formed by the conductors disposed within the columns and rows of depressions. In one particular embodiment, the depressions were formed in one inch squares and the conductors were placed ¼ inch apart so that finger pressure anywhere within the depressions would cause the spaced conductors of one set to contact the second set of conductors. Further, the horizontally disposed conductors may be disposed in grooves 17 which are set at a depth of approximately .025 whereas the vertically disposed conductors are set in grooves 18 set at a depth of approximately .005 to thereby provide a spacing of approximately .020 between the two sets of conductors. Further, the layer 14 could be made of a suitable material such as a translucent silicon rubber or a material identified as a vinyl Plexiglas (a trademark for a methyl methacrylate polymer of the Rehm and Haas Co.), a vinyl latex plastic or acrylic Plexiglas material having microscopically small cells or lenses disposed on one surface of this layer. Such plastics have been sold commercially under the trade name of "Polacoat Lenscreen" by the Polacoat Corporation.

Referring now to FIG. 3, there is shown a schematic circuit including the switching matrix 10 and an array of lamps 76 to 111 which is connected therewith to be energized when one portion of the switching matrix 10 is depressed. It is noted in FIG. 3 that only a single conductor is shown whereas in FIG. 1 three wires or conductors are shown in the actual physical embodiment. As shown in FIG. 3, the conductors 68 to 73 are disposed in columns transversing the plurality of conductors 62 to 67 passing in rows over them. As explained above, when a particular portion of the matrix 10 is depressed one of the conductors disposed in a column will be brought into electrical contact disposed in a row thereby closing a circuit including one of the lamps 76 to 111. In a similar manner, the array of lamps 76 to 111 are arranged in rows and columns and would be disposed so as to direct light through the corresponding depressed portions 20 to 55 respectively. More specifically, one portion of the circuit is formed by the conductors 62 to 67 which are connected to one terminal of the lamps; the other terminal of the lamps are connected to the switching matrix by the conductors 68 to 73. Further, a plurality of potential sources 112 to 117 are connected by the conductors 68 to 73 respectively to the array of lamps 76 to 111.

In operation (see FIGS. 2 and 3), if the area of the layer 14 corresponding to depression 20 were pressed, the conductors 62 and 68 would be electrically connected thereby closing a circuit including the power source 112 and the lamp 76. Since the lamp 76 is disposed behind the depressed portion 20 (see FIG. 2), the radiation therefrom would illuminate this depressed portion. As shown in FIG. 3, each of the lamps 76 to 111 has a numeral or a letter of the alphabet thereon. If lamp 76 were energized, the letter Z would be illuminated and would appear through the depressed portion 20. In a similar manner, when various portions of the flexible layer 14 are depressed, the corresponding numeral or letter of the alphabet will appear therethrough.

Referring now to FIG. 4, there is shown a display device 118 for mounting a plurality of segment lights 120 to 133 in the desired array (as shown in FIG. 4), which is capable of producing the numerals and letters of the alphabet (see FIG. 5). Although the actual construction of the display device 118 is not considered a part of this invention, such a member would typically include an insulating support layer upon which there is disposed a first electrode including a thin layer of electrically conductive material such as tin oxide, a layer of electroluminescent phosphor material, and a plurality of second electrodes. Each of the second electrodes are so shaped and are so disposed as to provide the segment lights 120 to 133 as shown in FIG. 4. Thus, when a suitable potential is applied between the thin layer of tin oxide and the selected second electrodes, corresponding segment lights will be energized to provide the desired numeral or letter of the alphabet. For example, the letter A may be formed by energizing the segment lights 121, 122, 126, 128 and 131. The remaining characters as shown in FIG. 5 may be similarly formed by energizing selected segment display lights. For a more complete description of such a display device, reference is made to U.S. Patent No. 2,922,993 to E. A. Sack, Jr., and assigned to the assignee of this invention.

Referring now to FIG. 6, there is shown a display system including the switching matrix 10 as described with respect to FIGS. 1 and 2 and the segment lights 120 to 133 of the display device 118 as described with respect to FIG. 4. In an actual physical embodiment, the display device 118 would be disposed behind the transparent switching matrix 10 for projecting images of the numerals and the letters of the alphabet (see FIG. 5) through the switching matrix 10 to be seen by a viewer. The display system includes a diode matrix capable of energizing the segment lights of the display device 118 to provide the desired character. More specifically, the diode matrix includes a plurality of relays 140 to 175 for connecting a power source 136 to the desired electrical conductor disposed along the vertical column of the diode matrix of FIG. 6. When one of the relays 140 to 175 is closed, the potential source 136 is thereby placed in parallel across the preselected segment lights to form the desired character. For example, if it were desired to display the character 1, relay 140 would be closed (as will be explained later) to thereby place the power source 136 in parallel relation with the segment lights 123, 127 and 130. Referring to FIG. 4, when the segment display lights 123, 127 and 138 are energized, the numeral 1 will be formed. It is noted that the diodes connected between the vertical conductor associated with the relay 140 and the horizontal conductors associated with the segment lights 123, 127 and 130 will be forward biased by the power source 136 thereby substantially placing the power source in parallel with these segment lights. In a similar manner if it is desired to display the letter A, relay 150 would be closed, thereby placing the power source 136 in parallel with the segment lights 128, 121, 122, 125 and 131. As a result, these segment display lights would be energized thereby forming the letter A.

Each of the relays 140 to 175 is closed in response to a signal applied thereto from a control system 176. The control system 176 is operative to sense through well known techniques the particular area of the flexible face layer 14 which has been depressed. As explained above, when a particular area of the flexible layer 14 is depressed, the corresponding conductors in one of the depressed portions are brought in contact thereby closing a circuit. For example, if the layer 14 corresponding to the depressed portion 20 is depressed, the conductors 68 and 62 will be brought into contact thereby closing a circuit. In general, the control circuit 176 is operative to sense a completed circuit between one of the vertical connectors 68 to 73 and one of the horizontal conductors 62 to 67. The control system 176 includes stored position instructors to enable it to pulse or to apply a signal to the preselected relay and in turn, to energize the desired array of segment lights. Thus, when a particular portion of the switching matrix 10 is depressed, the completed circuit is sensed by the control system 176 to energize a particular set of segment lamps to thereby display the desired character through the switching matrix 10. The display system shown in FIG. 6 is capable of projecting the numerals 0 through 9 and the letters of the alphabet. Thus, the viewer by touching different portions of the switching matrix 10 would be able to energize the appropriate lamps to produce each of these numerals and all of the letters of the alphabet. By repeated probing of the switching matrix 10, various letters or numerals or combination of letters could be provided to thereby aid in the educational process of the viewer.

In one particular embodiment, the control system 176 illustrated in FIG. 6 could include a plurality of the well known "AND" circuit devices having a first input responsive to one of the vertical conductors 68 to 73 and a second input responsive to one of the horizontal conductors 62 to 67. Thus, when one portion of the switching matrix 10 is depressed, the "AND" gate will provide an output signal to thereby close one of the relays 140 to 155 and to energize the desired segment lights. A similar "AND" gate will be provided for each area of the switching matrix 10 and will be responsive to the closed circuit formed by one of the vertical and one of the horizontal conductors.

Referring now to FIG. 7, there is shown an image display system including a switching matrix 10 as described with regard to FIGS. 1 and 2 and an image projector 178 for projecting the desired image onto the switching matrix 10 in response to the depression of a particular portion of the switching matrix 10. The image projector 178 includes a magazine 180 for storing a plurality of transparencies 182. Further, the image projector 178 includes a lamp 184 and a suitable lens system 186 for focusing the image contained upon the transparency 182 onto the switching matrix 10. A stepping motor 188 is operative to index the magazine 182 to a predetermined desired position corresponding to the selected depressed area of the switching matrix 10. More specifically, in response to a signal derived from a control device 190, the stepping motor 188 acts to rotate the magazine 180 to present the desired transparency 182 to the optical system of the image projector 178. The control device 190 is operative to sense through well known matrix techniques the particular area selected upon the flexible, face layer 14 of the switching matrix 10. This is accomplished within the controlled device 190 by sensing the completed circuit provided by depressing the selected area upon the switching matrix 10. More specifically, the controlled device senses the completed circuit formed by one of the vertical conductors 62 to 67 and one of the vertical conductors 68 to 73. The control device 190 includes stored position instructions which enable it to cause the stepping motor 188 to move the magazine 180 to the desired position thereby enabling the desired transparency 182 to be removed from the magazine 180 and to be inserted between the projector lamp 184 and the lens system 186. As a result, when a particular portion of the switching matrix 10 corresponding to one of the depressions 20 to 55 is depressed, the corresponding conductors are contacted thereby causing the controlled device 140 to apply a position indicating signal to the stepping motor 188. In turn, the magazine 180 is selectively positioned and a slide 182 is withdrawn by well known mechanisms to provide an image upon the face of the display switching matrix 10.

I claim as my invention:

1. A switching matrix apparatus comprising first and second sets of electrical conductors, a support member for suspending said first and second sets of electrical conductors so that said conductors of said first and second sets transverse each other at a plurality of points, a flexible layer disposed over said first and second sets of conductors to allow pressure to be applied through said flexible layer to bring at least one of said conductors of said first set into electrical contact with at least one conductor of said second set, said support member including a plurality of depressed portions positioned in rows and columns, said first set of conductors disposed along said columns of said depressed portions and said second set of conductors disposed along said rows of said depressed portions, said depressed portions separated by ridges for isolating the pressure applied to said flexible layer on a portion of said flexible layer corresponding to one depression from affecting the electrical conductors disposed in adjacent depressed portions of said support member, said ridges having first and second grooves therein for receiving respectively said first and second sets of conductors, said first grooves being of a different depth than said second grooves to thereby space said first and second conductors from each other, and means for applying spring biasing to said conductors of said first and second sets.

2. A switching matrix apparatus as claimed in claim 1, wherein said means for applying spring biasing includes a clip mounted upon said support member and including a plurality of spring biasing members to which said conductors are secured.

3. A switching matrix apparatus as claimed in claim 1, wherein a plurality of conductors are disposed within each of said columns and rows of said depressed portions.

4. A display system including said switching matrix apparatus as claimed in claim 1, said display system further including means for displaying varying images through said matrix apparatus in response to pressure applied to various portions of said flexible layer.

5. A display system as claimed in claim 4, wherein said means for displaying includes means for providing a radiation image, and a control system responsive to the closed circuit formed by at least one conductor of said first set and at least one conductor of said second set for controlling said means for providing a radiation image.

6. A display system as claimed in claim 5, wherein said means for providing a radiation image includes a plurality of lamps disposed in such an array so that various of said lamps may be energized by said control system to form numerals and letters of the alphabet.

7. A display system as claimed in claim 5, wherein said means for providing a radiation image includes first means for storing a plurality of transparencies, second means for projecting one of said transparencies onto said switching matrix apparatus, and third means responsive to said control system for coupling one of said transparencies to said means for projecting.

8. A display system as claimed in claim 6, wherein said means for storing includes a magazine, and said third means for coupling includes a stepping motor for positioning said magazine with respect to said second means for projecting said control system being responsive to the completed circuit between one of the conductors of said first and second sets for providing a position indicating signal to said stepping motor.

References Cited

UNITED STATES PATENTS

| | | | |
|---|---|---|---|
| 3,056,005 | 9/1962 | Larson | 200—86 |
| 3,226,604 | 12/1965 | Dreyfus-Alain | 340—166 |
| 3,264,418 | 8/1966 | Hagstrom | 200—1 |
| 3,308,253 | 3/1967 | Krakinowski | 200—86 |

THOMAS B. HABECKER, Primary Examiner

MARSHALL M. CURTIS, Assistant Examiner

U.S. Cl. X.R.

178—18; 200—1; 339—18; 340—166. 336